(12) United States Patent
Saha et al.

(10) Patent No.: US 7,363,945 B2
(45) Date of Patent: *Apr. 29, 2008

(54) LOW CHAMFER ANGLED TORQUE TUBE END FITTING WITH ELONGATED OVERFLOW GROOVE

(75) Inventors: Pradip K. Saha, Kent, WA (US); Matthew J. Berden, Seattle, WA (US)

(73) Assignee: The Boeing Co., Chicago, IL (US)

( * ) Notice: Subject to any disclaimer, the term of this patent is extended or adjusted under 35 U.S.C. 154(b) by 626 days.

This patent is subject to a terminal disclaimer.

(21) Appl. No.: 10/710,645

(22) Filed: Jul. 27, 2004

(65) Prior Publication Data

US 2005/0051224 A1    Mar. 10, 2005

Related U.S. Application Data

(63) Continuation-in-part of application No. 10/253,564, filed on Sep. 24, 2002, now Pat. No. 6,932,118.

(51) Int. Cl.
*F16L 9/00* (2006.01)
*B23P 25/00* (2006.01)

(52) U.S. Cl. ............... 138/109; 138/146; 138/155; 29/458; 29/419.2; 74/607

(58) Field of Classification Search ........... 138/109, 138/155, 146, 177, DIG. 11; 29/458, 419.2; 74/607; 285/382, 382.2; 403/274, 375, 403/285, 266, 345, 359.6
See application file for complete search history.

(56) References Cited

U.S. PATENT DOCUMENTS

| | | | |
|---|---|---|---|
| 1,548,990 A | * 8/1925 | Garman | 403/285 |
| 4,154,082 A | * 5/1979 | Beech | 72/370.05 |
| 4,513,488 A | * 4/1985 | Arena | 29/516 |
| 4,523,872 A | * 6/1985 | Arena et al. | 403/274 |
| 4,561,799 A | * 12/1985 | Arena | 403/285 |
| 5,090,834 A | * 2/1992 | Yamamoto | 403/277 |
| 5,936,022 A | * 8/1999 | Freeman | 524/442 |
| 5,951,794 A | * 9/1999 | Dickson, Jr. | 148/690 |
| 5,981,921 A | * 11/1999 | Yablochnikov | 219/603 |
| 5,983,478 A | * 11/1999 | Dolan et al. | 29/419.2 |
| 6,065,317 A | * 5/2000 | Steingroever | 72/56 |
| 6,484,384 B1 | * 11/2002 | Gibson et al. | 29/516 |
| 6,932,118 B2 | * 8/2005 | Saha et al. | 138/109 |

FOREIGN PATENT DOCUMENTS

| EP | 0195150 A1 | 9/1988 |
|---|---|---|
| EP | 1402969 A2 | 3/2004 |

* cited by examiner

*Primary Examiner*—James Hook
(74) *Attorney, Agent, or Firm*—Ostrager Chong Flaherty & Broitman PC

(57) ABSTRACT

A method of forming a torque-transmitting coupling (193) includes forming at least one fitting (192) having a tube conforming area (200). The forming area (200) includes a material overflow groove (194) and multiple flat surfaces (202). The forming area (200) has an associated tube arc length that is approximately equal in length to a formed area length of the flat surfaces (202) with the elongated overflow groove (194). An elongated tube (190) is procured. The elongated tube (190) is formed onto the tube conforming area (200) to form the torque-transmitting coupling (193).

37 Claims, 5 Drawing Sheets

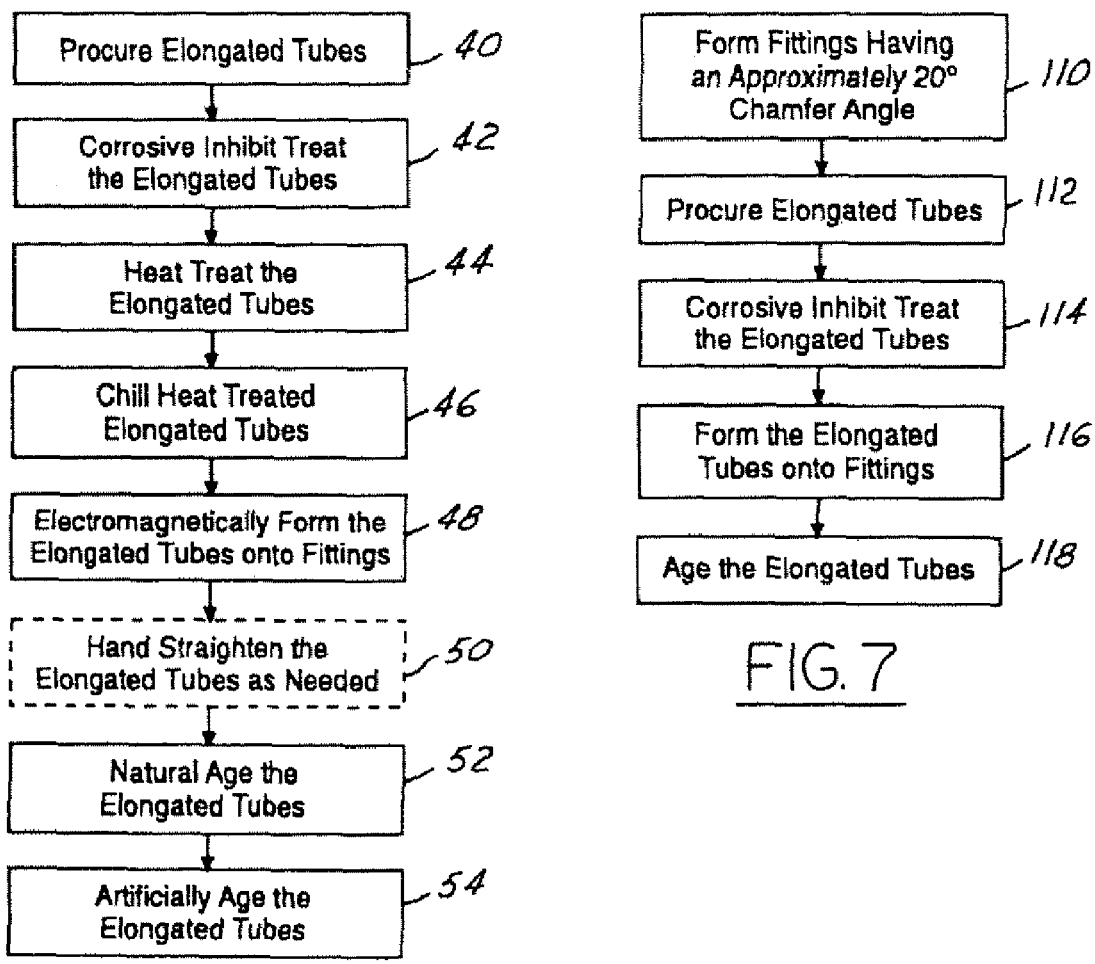
(PRIOR ART)
FIG. 3
FIG. 7
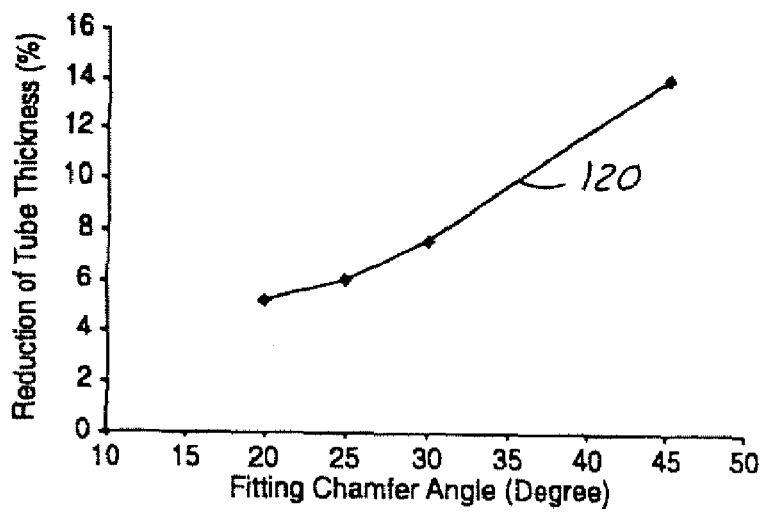
FIG. 8

LOW CHAMFER ANGLED TORQUE TUBE END FITTING WITH ELONGATED OVERFLOW GROOVE

BACKGROUND OF INVENTION

The present application is a continuation-in-part of U.S. patent application Ser. No. 10/253,564, filed on Sep. 24, 2002 now U.S. Pat. No. 6,932,118, entitled "Lower Chamfer Angled Torque Tube End Fitting", which is incorporated by reference herein.

The present invention relates generally to vehicle systems, and more particularly, to a torque tube and a method of manufacturing the torque tube.

Torque tubes are typically used for mechanically transmitting torque from a power drive unit to a rotating device that provides translation motion. For example, a torque tube is commonly used in a ground-based vehicle to transfer torque from an engine to a front or rear axle, which in turn rotates the wheels of the vehicle to provide propulsion. Another example application is in an aircraft whereby a torque tube may be utilized for the transmitting of torque between a power drive unit and a ballscrew, which provides either horizontal or vertical translation of airfoil surface adjusting devices such as flaps and slats.

Many applications of torque tubes, including the above mentioned, require that the torque tube be lightweight, inexpensive, have high fatigue strength, and a yield strength at an end fitting equal to or exceeding that of the tube itself. Thus, torque tubes for aircraft are formed from 2024 aluminum due to its inherent lightweight and strength characteristics over that of steel.

A typical torque tube has an elongated tube section, which is conformed over a fitting. The fitting has multiple chamfered surfaces between a pair of upper flat surfaces and multiple lower flat surfaces with chamfer angles that are approximately 45° relative to the lower surfaces. The upper surfaces transition to the chamfer surfaces at relatively sharp chamfer edges. The fitting also has multiple overflow grooves that transition between recessed areas and the lower flat surfaces, via groove edges.

The chamfer edges and the groove edges cause notches to be formed in the elongated tube, when conformed over the fitting. Thinning occurs in the elongated tube near the notches and can cause fatigue cracking over time. Cracking, as known in the art, reduces fatigue life of a component and is therefore undesirable.

Elongated tubes are normally procured having a T-3 temper condition. The elongated tubes are treated with a chemical film, such as alodine, to create a corrosive inhibiting surface coating. The elongated tubes are heat treated for an extended period of time in a furnace such that the elongated tubes are of a solid solution or in a W tempered condition. A disadvantage with heat treating the elongated tubes is that the corrosive inhibiting surface coating is negatively affected during the heat treatment. The elongated tubes are placed in a freezer, to maintain the W condition and prevent aging of the tubes, up until electromagnetic forming over the end fittings.

During forming of the elongated tubes, tube walls are significantly thinned. Due to stretching and thinning of the tube walls, the tubes are weakened and are susceptible to cracking under fatigue. Thinning can be difficult to detect by ordinary inspection procedures without destructive testing.

Upon completion of forming the elongated tubes, depending upon length of the tubes, the tubes are hand straightened. The elongated tubes are then naturally aged to a T-42 temper until a significant amount of tubes are ready for artificial aging, due to costs of operating a furnace as to perform artificial aging. The elongated tubes are artificially aged in a furnace to again alter temper of the tubes from having a T-42 temper to having a T-62 temper, which is of strength suitable for application use.

The above-mentioned process of manufacturing a torque tube is time consuming and costly due the amount of steps within the process and the requirements for each step.

Thus, there exists a need for an improved method of manufacturing a torque tube that provides more durable chamfer portions with increased fatigue life, that minimizes warping of the elongated tubes, and that has decreased production cycle times and manufacturing costs. It is also desirable that the manufacturing method provides a torque tube having an elongated tube with at least the same temper of current elongated tubes.

SUMMARY OF INVENTION

In one embodiment of the present invention a method is provided for forming a torque-transmitting coupling includes forming at least one fitting having an elongated tube conforming area. The forming area includes a material overflow groove and multiple flat surfaces. The forming area has an associated tube arc length that is approximately equal in length to a formed area length of the flat surfaces with the elongated overflow groove. An elongated tube is procured. The elongated tube is formed onto the tube conforming area to form the torque-transmitting coupling.

The present invention has several advantages over existing torque tube manufacturing methods. One advantage provided by an embodiment of the present invention is the provision of a torque-transmitting coupling having an associated tube arc length that is approximately equal in length to a formed chamfer area length of the chamfer surface and the elongated overflow groove of the coupling. This provides a torque tube with uniform wall thicknesses over chamfer areas that are not in tension or compression. Such provision provides a torque tube with increased fatigue life, increased axial and torque load strength, minimizes tube weight, allows for increased tube material variation, and decreases end fitting manufacture costs and torque tube raw material costs.

Another advantage provided by an embodiment of the present invention is the provision of having chamfer areas with chamfer angles of approximately 20°. This provides a torque tube with increased strength and less susceptibility to cracking in the chamfer areas, thus providing a torque tube with increased fatigue life.

Yet another advantage provided by an embodiment of the present invention is the provision of a manufacturing method that contains a decreased amount of manufacturing steps by eliminating a need for heat treating, subsequent chilling of, hand straightening of, and minimizing natural aging time of the elongated tube. The present invention by reducing the amount of manufacturing steps not only decreases production cycle time and manufacturing costs but also eliminates disadvantages associated with the eliminated steps.

A further advantage provided by an embodiment of the present invention is the provision of elongated overflow grooves within a torque tube, which further increase strength and prevent cracking in the walls of the torque tube for increased fatigue life.

The present invention itself, together with further objects and attendant advantages, will be best understood by reference to the following detailed description, taken in conjunction with the accompanying drawing.

BRIEF DESCRIPTION OF DRAWINGS

FIG. 3 is a logic flow diagram illustrating a conventional "W" forming torque tube manufacturing process;

FIG. 7 is a logic flow diagram illustrating a method of manufacturing the torque tube of FIG. 4 in accordance with an embodiment of the present invention;

FIG. 8 is a plot of reduction in tube wall thickness versus fitting chamfer angle in accordance with an embodiment of the present invention;

DETAILED DESCRIPTION

Figure 1:
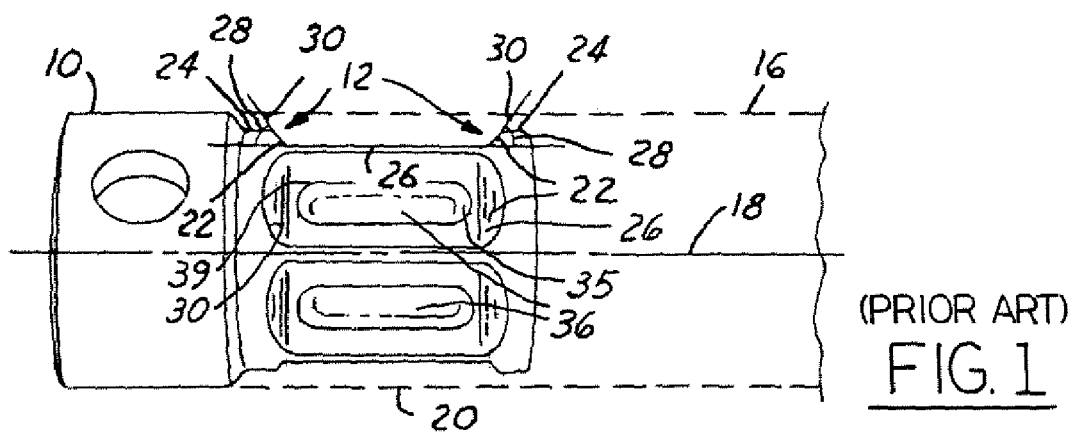
FIG. 1 is a perspective view of an end fitting of a traditional torque tube.
Figure 2:
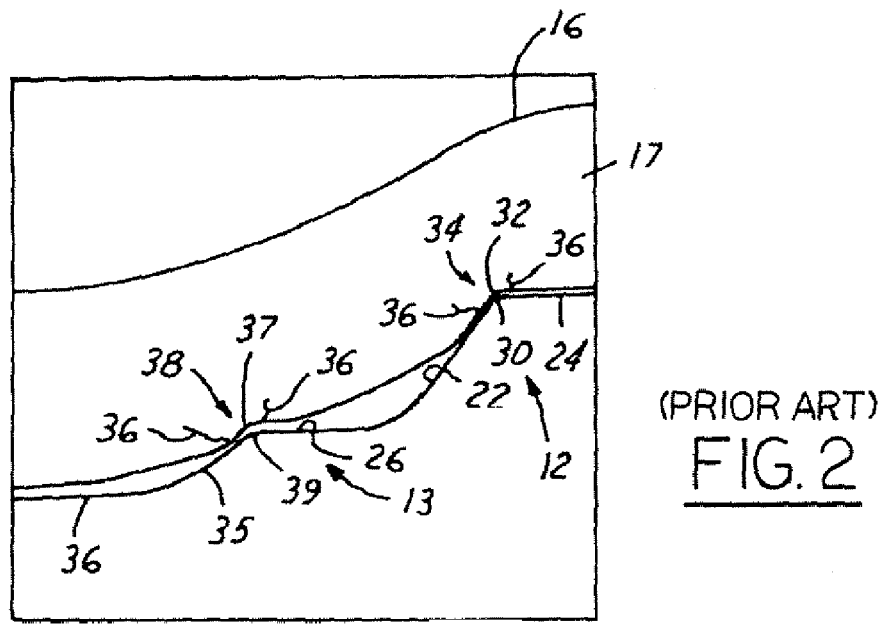
FIG. 2 is a cross-sectional close-up view of chamfer areas and groove areas of a traditional torque tube.

Referring now to prior art FIGS. 1 and 2, a perspective view of an end fitting 10 and a cross-sectional close-up view of chamfer areas 12 and groove areas 13 of a traditional torque tube 14 are shown. The torque tube 14 has an elongated cylindrical tube 16 having a tube wall 17 and a longitudinal axis 18 extending through a center of and along length of the tube 16. An end 20 of the elongated tube 16 is coaxially formed and fixed onto the fitting 10. Only one end 20 of the elongated tube 16 is shown, typically, a second end of the elongated tube is formed and fixed to a second fitting, similar to fitting 10.

The fitting 10 has multiple chamfered surfaces 22, between a pair of upper flat surfaces 24 and multiple lower flat surfaces 26, with chamfer angles 28 that are approximately 45° relative to the lower surfaces 26. The upper surfaces 24 transition to the chamfer surfaces 22 at relatively sharp chamfer edges 30. The chamfer edges 30 correspond with upper notches 32 that are formed in a chamfer portion 34 of the elongated tube 16 that is formed over the chamfer edges 30.

The fitting 10 also has multiple overflow grooves 35 that transition between recessed areas 36 and the lower flat surfaces 26. Lower notches 37, similar to upper notches 32 are formed in groove portions 38 of the elongated tube 16 over groove edges 39.

Thinning occurs in the chamfer portion 34 and the groove portion 38 near the notches 32 and 37 as shown and can cause fatigue cracking over time as indicated by reference number 36. Thinning occurs due to a combination of compression stress with additional bending against chamfer edge 30 and groove edge 39, which causes high stress concentrations in the portions 34 and 38, respectively, reducing fatigue life. Cracking, as known in the art, reduces fatigue life of a component and is therefore undesirable. Thinning occurs due to bending and stretching experienced by the elongated tube 16 during forming of the tube 16 onto the fitting 10 during manufacturing of the torque tube 14, which is described in more detail below.

Referring now to prior art FIG. 3, a logic flow diagram illustrating a conventional "W" forming torque tube manufacturing process is shown. Elongated tubes are normally procured having a T-3 temper condition and are of various sizes, as generally indicated by step 40. The elongated tubes are treated with a chemical film such as alodine to create a corrosive inhibiting surface coating, as generally indicated by step 42.

In step 44, the elongated tubes are heat treated for an extended period of time in a furnace such that the elongated tubes are of a solid solution or in a W tempered condition. Aluminum material of the elongated tubes when in the W condition is of a lower strength temper than that of aluminum material in the T-3 condition. The elongated tubes are more malleable in the W condition than when in the T-3 condition, allowing the tubes to be formed over edges to a greater degree with less forming stress. A disadvantage with heat treating the elongated tubes is that the corrosive inhibiting surface coating is negatively affected during the heat treatment.

In step 46, the elongated tubes are placed in a freezer to maintain the W condition and prevent aging of the tubes up until forming of the tubes.

In step 48, the elongated tubes are formed over the end fittings. The portions of the end fittings are inserted into ends of the elongated tube and then electromagnetically formed over the inserted portions of the fittings to conform the tube onto the end fittings. Electromagnetic forming is used since it is an efficient, high volume, precisely repeatable production process. During electromagnetic forming the ends of the elongated tubes are compressed via an electromagnetic pulse or impact from a magnetic coil. Chamfer portions of the elongated tubes are under tension and stretched over the sharp chamfer edges in the fittings forming the notches. During forming of the elongated tubes, thickness of the tube walls is significantly thinned in the chamfer portions. Due to the stretching of the material and thinning of the walls in the chamfer portions, the tubes are weakened and are susceptible to cracking under fatigue therein. Thinning can be difficult to detect by ordinary inspection procedures without destructive testing.

In step 50, depending upon length of an elongated tube, the elongated tube is hand straightened. During heat treatment the elongated tubes that are longer in length tend to warp or disfigure such that straightening is required before use.

In step 52, the elongated tubes are naturally aged to a T-42 temper until a significant amount of tubes are ready for artificial aging, due to costs of operating a furnace as to perform artificial aging.

In step 54, the elongated tubes are artificially aged in a furnace to again alter temper of the tubes from having a T-42 temper to having a T-62 temper, which is of a strength suitable for application use.

The above-mentioned process of manufacturing a torque tube is time consuming and costly due the amount of steps within the process and the requirements for each step.

In each of the following figures, the same reference numerals are used to refer to the same components. While the present invention is described with respect to a torque tube of an aircraft and a method of manufacturing the torque tube, the present invention may be adapted for various applications including ground-based vehicles, aeronautical vehicles, watercraft, fuselage torque tubes, door torque tubes, landing systems, and other applications known in the art that require the use of torque tubes.

In the following description, various operating parameters and components are described for one constructed embodiment. These specific parameters and components are included as examples and are not meant to be limiting.

Figure 4:
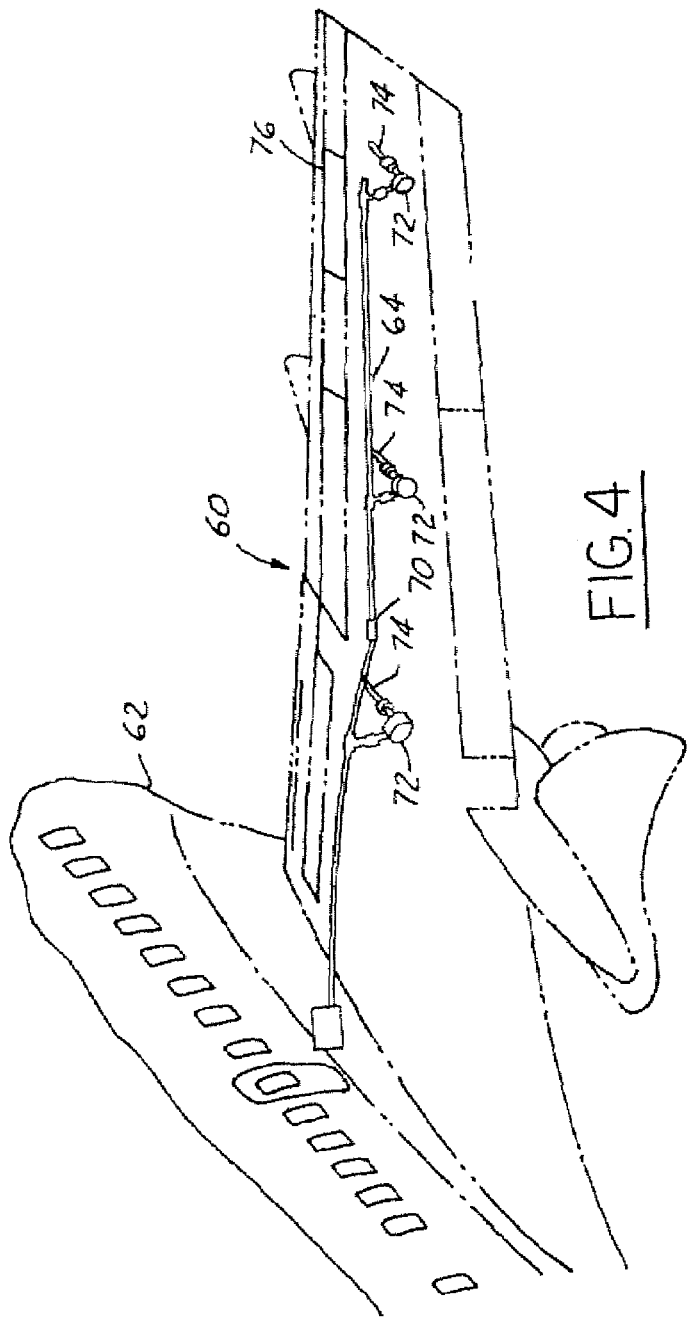
FIG. 4 is a perspective view of a trailing edge flap control system for an aircraft having a torque tube in accordance with an embodiment of the present invention.

Referring now to FIG. 4, a perspective view of a trailing edge flap control system 60 for an aircraft 62 having a torque tube 64 in accordance with an embodiment of the present invention is shown. The system 60 includes a power drive unit 66 that is mechanically coupled to and rotates the torque tube 64 via multiple angled gearboxes 70. The torque tube 64 is mechanically coupled to multiple flap transmissions 72, which transfer rotational energy from the torque tube 64 to multiple ball screws and gimbals 74 that translate a flap 76. The above-described system is an example of an application for the torque tube 64 of the present invention; the torque tube 64 may be applied in various other applications as indicated above. Also, the torque tube 64 may be of various sizes, shapes, types, and styles as known in the art.

Figure 6:
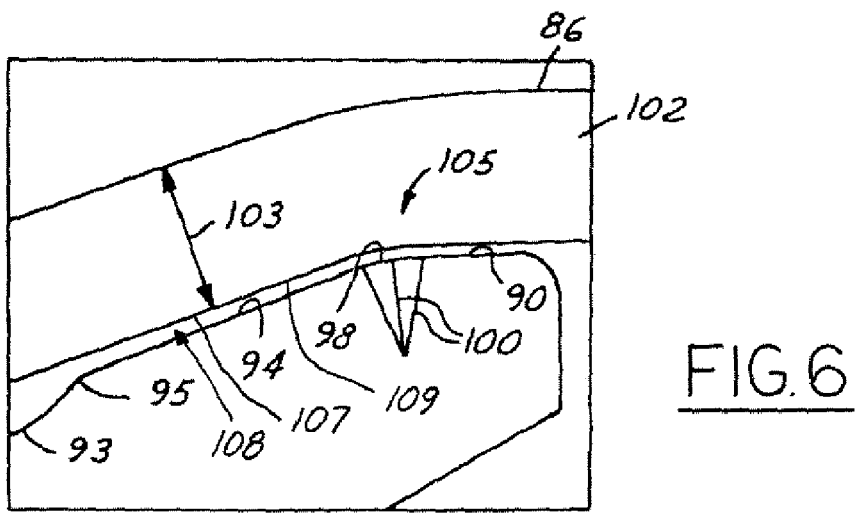
FIG. 6 is a cross-sectional close-up view of a chamfer area of the torque tube of FIG. 4 in accordance with an embodiment of the present invention.
Figure 5:
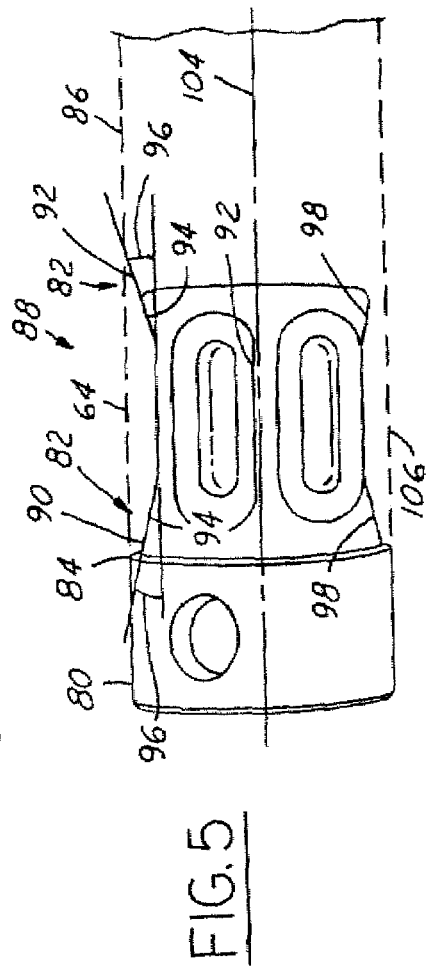
FIG. 5 is a perspective view of a fitting of the torque tube of FIG. 4 in accordance with an embodiment of the present invention.

Referring now to FIGS. 5 and 6, a perspective view of a fitting 80 and a cross-sectional close-up view of chamfer areas 82 of the torque tube 64 in accordance with an embodiment of the present invention are shown. The torque tube 64 includes one or more torque-transmitting couplings 84. Each torque-transmitting coupling has an elongated tube 86 that is formed onto at least one fitting, such as fitting 80.

The fitting 80 includes an elongated tube conforming area 88 having a pair of upper surfaces 90 and lower surfaces 92, therebetween. The chamfer surfaces 94 and the lower surfaces 92 transition to overflow groove areas 93 over groove edges 95. Chamfer surfaces 94 provide transition between the upper surfaces 90 and the lower surfaces 92. Each upper surface 90 separately and in combination with, the lower surfaces 92, and a corresponding chamfer surface 94 forms the chamfer areas 82. The chamfer surfaces 94 are at chamfer angles 96 of approximately 20° relative to the lower surface 92. Note that the fittings of the present invention do not include a lower flat portion as that of the prior art, due to the chamfer angles 96. Chamfer arced surfaces 98 exist between the chamfer surfaces 94 and the upper surfaces 90, having a significantly sized radius 100 that provides a smooth transition therebetween. The fitting 80, although being preferably formed of stainless steel so as to withstand forming of the elongated tube onto the fittings without deformation, may be formed of other materials known in the art.

The elongated tube 86 has a tube wall 102 that is cylindrically shaped having a thickness 103 that may be a single continuous thickness or may be a varying thickness along a centerline 104 of the tube 86. The tube wall 102 has chamfer portions 105 that correspond to chamfer areas 82. The elongated tube 86 is preferably formed from 2024 aluminum for inherent lightweight and strength characteristics of the aluminum. Of course, other materials known in the art may be utilized including steel, copper, brass, or a nickel alloy.

Referring now also to FIG. 7, a logic flow diagram illustrating a method of manufacturing a torque tube in accordance with an embodiment of the present invention is shown.

In step 110, the fitting 80 is formed as described above to have the chamfer angles 96 of approximately 20° and the chamfer arced surfaces 98 having radii 100 between the chamfer surfaces 94 and the upper surfaces 90. The chamfer angles of approximately 20° and the chamfer arced surfaces 98 minimize thinning and stressing of the elongated tube 86 during forming of the tube 86 onto the fitting 80, which is described in more detail below.

In step 112, the elongated tube 86 is procured having preferably a T-3 temper for the application of FIG. 4. Industry standard processes are: utilized to extrude, handle, draw, and treat the elongated tube 86. The elongated tube 86 is formed such that there is no seam in the tube wall 102.

In step 114, the elongated tube 86 is corrosive inhibit treated by applying a chemical coating or first layer such as alodine to the tube walls 102 to form a first corrosive inhibiting layer 107, using methods known in the art. A second corrosive inhibiting layer 108 may also be applied, such as paint or other similar material known in the art, to further aid in prevention of corrosion. In one embodiment of the present invention the second layer is applied to an interior surface 109 of the tube walls 102.

In step 116, an end portion 106 of the elongated tube 86 is formed onto the elongate tube conforming area 88 to form a torque-transmitting coupling 84. The elongated tube 86 is formed onto the fitting 80 without creating notches in the tube wall 102, unlike that of prior art torque tube manufacturing methods. Although, it is preferred that the elongated tube 86 be electromagnetically formed onto the fitting 80, other forming techniques may be used to exert pressure on the tube wall 102 to deform it around the fitting 80 including swaging, hydroforming, rubber press forming, or explosive forming. Amount of stretching and stress experienced, during forming of the tube 86, is minimized due to the fitting 80 having the chamfer angles 96 of approximately 20° and the chamfer arced surfaces 98, thereby also minimizing amount of thinning of the tube wall 102 over the chamfer areas 82. In one embodiment of the present invention, upon completion of forming the elongated tube 86 onto the fitting 80 the thickness 103 of the tube wall 102 over the chamfer arced surfaces 98 is approximately 0.0795 inches as compared to that of the prior art, which is approximately 0.0716 inches thick over the chamfer edges, thus a significant minimization in thinning from an original tube wall thickness of 0.0831 inches exists utilizing the present invention. This difference in thickness of the tube wall 102 significantly improves fatigue life in the chamfer portions 105.

In step 118, the elongated tube 86 is artificially aged in a furnace for a period of time, as known in the art. Upon completion of artificial aging, the aluminum material of the tube wall 102 is of a T-81 temper, which has approximately equivalent mechanical properties to that of aluminum having a T-62 temper as elongated tubes of the prior art. Thus, the present invention eliminates the need to naturally age the elongated tube whereby aluminum material in a W condition is converted to have a T-42 temper, which can then be converted to have a T-62 temper by artificial aging. The present invention, through artificial aging, directly converts the elongated tube 86 having a T-3 temper to having a T-82 temper.

Referring now to FIG. 8, a plot of reduction in tube wall thickness versus fitting chamfer angle in accordance with an embodiment of the present invention is shown. The thickness 103 in the chamfer portions 105 is generally thinned during forming of the elongated tube 86 onto the fitting 80, due to stretching of the tube wall 102. As chamfer angles 96 are decreased, the amount of thinning of the tube wall 102 is decreased, as illustrated by curve 120. Unfortunately, ability to decrease the chamfer angles 96 is limited by strength of the coupling 84 between the elongated tube 86 and the fitting 80. The smaller the chamfer angles 96 the less force is needed to axially pull out the fitting 80 from the elongated tube 86. Also, for every smaller increment in chamfer angles 96 there is smaller difference in thickness of the formed tube wall 102. For example, when the chamfer angles 96 are decreased from 45° to 40°, the difference in thickness 103 is approximately 2%, unlike when the chamfer angles 96 are decreased from 25° to 20°, the difference in thickness 103 is approximately 0.8%.

As known in the art, it is desired that the torque-transmitting coupling 84 be stronger than that of the elongated tube 86 itself and be able to withstand fatigue loading for a period exceeding approximately four times a service life of the aircraft 62. The greater strength of the torque-transmitting coupling 84 over that of the elongated tube 86 better assures that a failure in the coupling 84 does not occur during loading. Thus, in order to have a torque-transmitting coupling 84 that has the desired strength and is formed so as to minimize cracking in the chamfer portions 105, chamfer angles 96 of approximately 20° are utilized.

The above-described steps are meant to be an illustrative example; the steps may be performed synchronously, continuously, or in a different order depending upon the application.

Figure 9A:
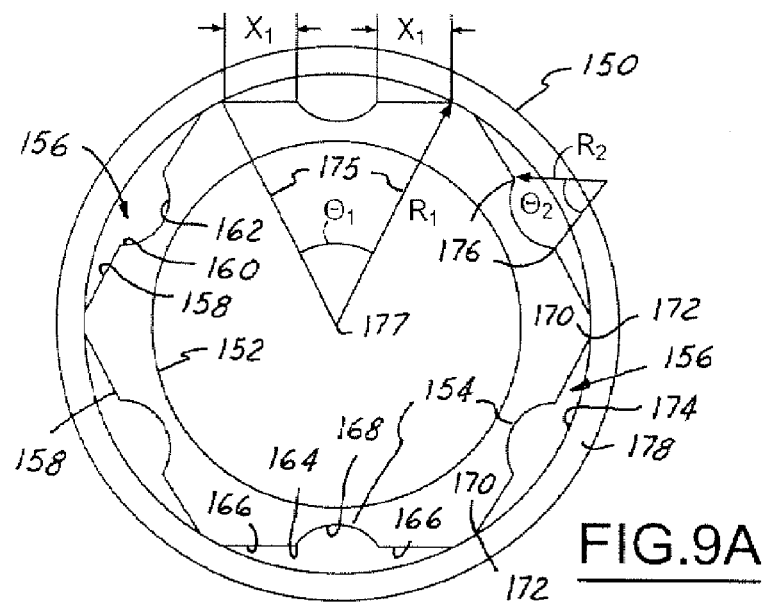
FIG. 9A is a cross-sectional view of a torque tube residing over a fitting that has non-elongated overflow grooves.

Referring now to FIG. 9A, a cross-sectional view of a torque tube 150 is shown residing over a fitting 152 that has non-elongated overflow grooves 154. The fitting 152 has hexagonal areas 156 with flat surfaces 158 and overflow grooves 154 residing therebetween. The fitting 152 is hexagonally shaped with six flat surfaces 160, which are the same surfaces formed by pairs of the flat surfaces 158 and the overflow groove surfaces 162. For example hexagonal surface 164 includes the pair of flat surfaces 166 and the overflow groove surface 168. Although the fitting 152 is shown as being hexagonally shaped, the fitting may be shaped similar to any axial polygons. The fitting 152 also includes multiple tube contact points 170 that are located at the edges 172 of each hexagonal surface 160 and are in contact with an inner surface 174 of the tube 150.

The forming areas 156 have associated tube arc lengths and formed area lengths. The tube arc lengths are equal to the radius $R_1$ of the inner surface 174 multiplied by the angles between radii 175 over the chamfer areas 156, which are designated by $\theta_1$. The radii 175 extend through the subsequent contact points 170 and the center 177 of the tube 150 and the fitting 152. The formed area lengths are equal to the sum of the lengths $X_1$ of the flat surfaces 158 and the arc length of the associated overflow groove 154 between subsequent contact points 170 over the forming areas 156. The length of the overflow grooves 154 between the contact points 170 over the flat areas 158 is equal to the radii $R_2$ associated with the overflow grooves 154 multiplied by the angles between the radii $R_2$, that intersect the edges 176 of the overflow grooves 154, which are designated by $\theta_2$. The formed area lengths are represented by equation 1 for each forming area 156.

$$\text{Formed area length}=2X_1+R_2\theta_2 \qquad (1)$$

Note that since the overflow grooves 154 are not elongated, in other words, since the formed area lengths $2X_1+R_2\theta_2$ are substantially larger than the tube arc lengths $R_1\theta_1$, the tube wall 178 when formed over the fitting 152 is in tension in the forming areas 156.

Figure 9B:
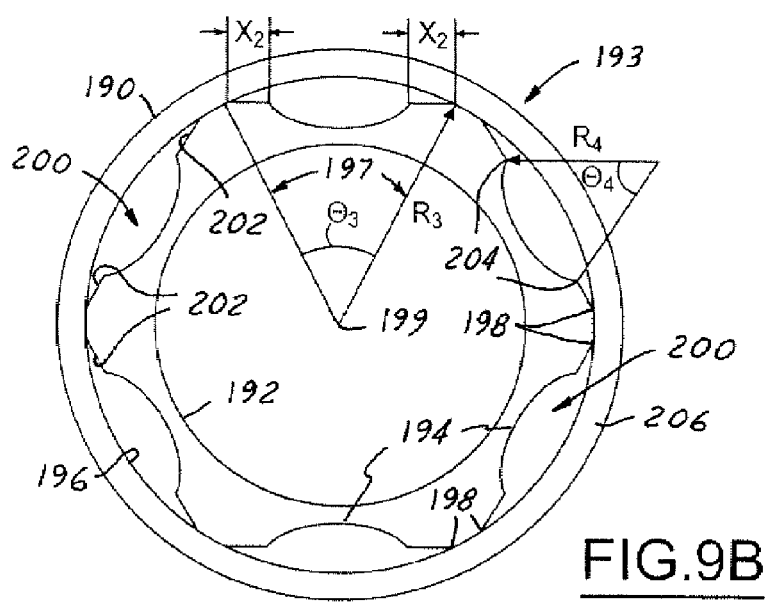
FIG. 9B is a cross-sectional view of a torque tube residing over a fitting that has elongated overflow grooves in accordance with another embodiment of the present invention.

Referring now to FIG. 9B, a cross-sectional view of a torque tube 190 is shown residing over a fitting 192 that has elongated material overflow grooves 194 in accordance with another embodiment of the present invention. The tube 190 and the fitting 192 form a torque transmitting joint 193, similar to the torque transmitting coupling 84 shown in FIG. 4. As with the tube 150 and fitting 152, the tube 190 and the fitting 192 have tube arc lengths and formed area lengths. The arc length for the tube 190 is equal to the radius $R_3$ of the inner surface 196 of the tube 190 multiplied by the angle between radii 197 over the elongated tube conforming areas 200, which are designated by $\theta_3$. The radii 197 extend through the subsequent contact points 198 and the center 199 of the tube 190 and the fitting 192. The radii $R_4$ may be equal in size to the radii $R_2$ and the angles $\theta_4$ may be equal in size to the angles $\theta_2$. The length of the formed area lengths of the fitting 192 is equal to the sum of the lengths $X_2$ of the non-arced or generally flat surfaces 202 and the arc length of the associated overflow grooves 194 between the subsequent contact points 198 over the forming areas 200. The overflow grooves 194 are centered between the flat surfaces 202. The formed area lengths are represented by equation 2 for each forming area 200. The formed flat surface lengths are designated by $X_2$.

$$\text{Formed area length}=2X_2+R_4\theta_4 \qquad (2)$$

The length of the overflow grove 194 between the contact points 198 over the forming areas 200 is equal to the radii $R_4$ associated with the overflow grooves 194 multiplied by the angles between radii $R_4$ that intersect the edges 204 of the overflow grooves 194, which are designated by $\theta_4$.

Note that the overflow grooves 194 are elongated and that the formed area lengths $2X_2+R_4\theta_4$ are approximately equal in length to that of the tube arc lengths $R_3\theta_3$, thus the tube wall 206 is neither in tension or compression when formed over the forming areas 200. The fitting 192 is formed such that the formed area lengths $2X_2+R_4\theta_4$ are approximately equal in length to that of the tube arc lengths $R_3\theta_3 \pm 0.5\%$ such that the tube wall 206 is neither in tension nor compression over the forming areas 200 or is within a minimal tension or compression range 210, as can be seen in the plot of FIG. 10.

Figure 10:
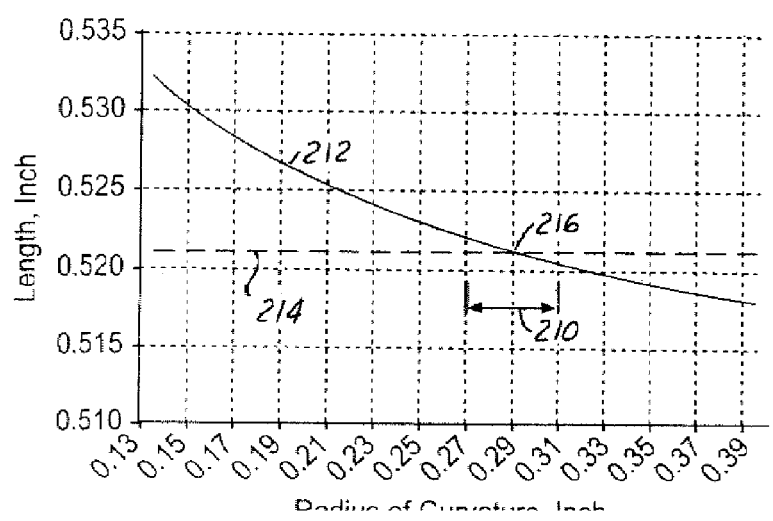
FIG. 10 is a plot of torque tube formed length versus arc length for tube wall stretching determination and comparisons in accordance with an embodiment of the present invention.

In FIG. 10, a plot of overflow groove fitting radius versus formed area length is shown. Formed area length is represented by the solid curve 212 and tube arc length is represented by the dashed curve 214. A neutral point 216 exists where the formed chamfer area length is equal to the tube arc length. The neutral point 216 represents a tube wall that is neither in tension nor compression. When the formed area length is greater than the tube arc length the associated tube wall is in tension over a corresponding forming area. When the formed chamfer area length is smaller in length than the tube arc length the tube wall is in compression over the forming area. The minimal tension or compression range 210 may be within ±10% of the radius of curvature from the neutral point 216.

The difference between the formed area length and associated tube arc length corresponds to the strain of the tube wall over the hexagonal flat surface area and the overflow groove area. It is desirable when forming a torque tube over a fitting to minimize this stretching. Forming of a tube onto a fitting designed with the neutral point 216 satisfies this desire.

Figure 11A:
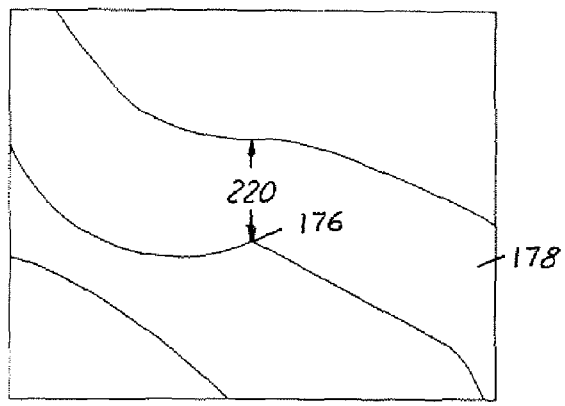
FIG. 11A is a cross-sectional close-up view of a chamfer area of the fitting and torque tube of FIG. 9A illustrating the associated amount of torque tube wall thinning.
Figure 11B:
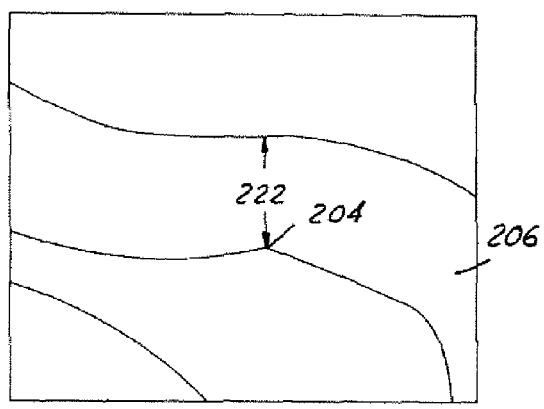
FIG. 11B is a cross-sectional close-up view of a chamfer area of the fitting and torque tube of FIG. 9B illustrating the associated amount of torque tube wall thinning.

The enlarging of overflow groove radii such that a tube is formed near the neutral point also minimizes the magnitude of "necking" and thinning of a tube wall at the edges of the overflow grooves. This can be seen in FIGS. 11A and 11B. Thinning of the tube wall 178 is approximately 18% over the edges 176, as compared to the thinning of tube 190, which is about 14% over the edges 204. The amount of bending at the edges 176 is greater than that over the edges 204, since the transition between the overflow grooves 154 and the flat surfaces 158 is more abrupt due to smaller overflow groove radii $R_2$ and associated angles $\theta_2$. Thus, there is a larger amount of thinning in the thickness 220 of the tube wall 178 over the edges 176 as compared to the amount of thinning in the thickness 222 of the tube wall 206 over the edges 204. This can be further seen in FIGS. 12A and 12B.

Figure 12A:
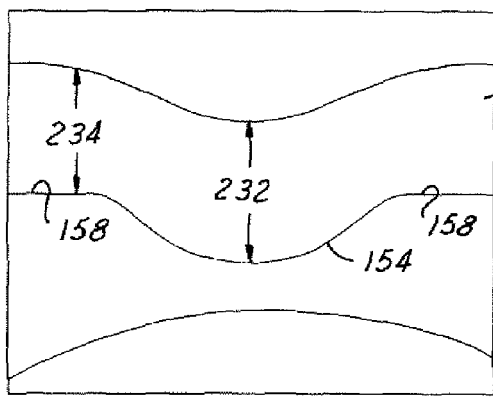
FIG. 12A is a cross-sectional close-up view of a chamfer area of the fitting and torque tube of FIG. 9A illustrating associated torque tube wall uniformity.
Figure 12B:
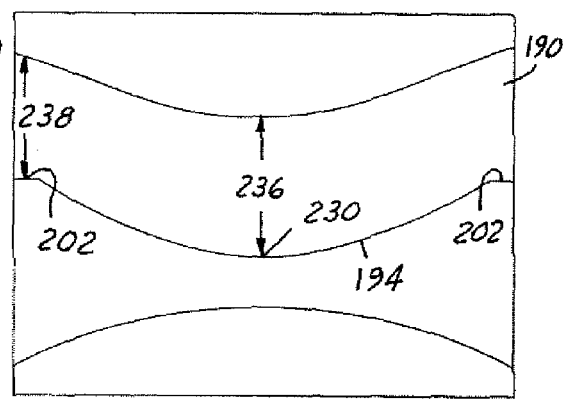
FIG. 12B is a cross-sectional close-up view of a chamfer area of the fitting and torque tube of FIG. 9B illustrating associated torque tube wall uniformity.

Referring now to FIGS. 12A and 12B, cross-sectional close-Up views of the forming areas 156 and 200 of the torque tubes 150 and 190 and the fittings 152 and 192 of FIGS. 9A and 9B are shown illustrating tube wall uniformity for the stated tubes. The tube wall thickness of the tube 190 is more uniform across the forming area 200 than the tube wall thickness of the tube 150. Increased overflow groove radius provides a smoother variation or transition between the overflow grove 194 and the flat surfaces 202. Increased overflow groove radius also aids in maintaining a constant tube wall thickness across the overflow groove 194, including over the center 230 of the overflow grove 194 where tube wall thickness tends to increase, as is the case for the tube wall 150. The center thickness 232 of the tube 150 over the groove 154 is larger than the flat surface wall thickness 234 of the tube 150 over the flat surfaces 158. The center thickness 236 of the tube 190 over the groove 194 is approximately equal in size to that of the flat surface wall thickness 238 of the tube 190 over the flat surfaces 202. Thus, there is minimal thickness variation of the tube wall 190 over the forming area 200.

The torque tube 190 may be formed using the method of FIG. 7, but with step 110 modified. In step 110, the fitting 192 is formed having the characteristics as described above.

The present invention provides a torque tube fitting design that minimizes residual stress in the forming area of a torque tube by enlarging the overflow groove radius. The present invention also forms a torque tube with a minimum amount of thinning and stress concentration in the forming area of elongated tubes onto fittings and during loading of the elongated tubes. By minimizing crack initiation and growth within tube walls, tube wall thickness variations, and tension and compression of tube walls, fatigue life is increased. The present invention also eliminates the need for heat treatment and chilling of the T-3 tempered elongated tubes before forming, which reduces manufacturing time between procurement to forming of the elongated tubes by approximately 50%. The present invention by eliminating a need for several manufacturing steps reduces amount of production equipment needed to produce a torque tube. Thus, the present invention reduces costs involved in the manufacturing of torque tubes.

The above-described apparatus and method, to one skilled in the art, is capable of being adapted for various applications and systems known in the art. The above-described invention can also be varied without deviating from the true scope of the invention.

The invention claimed is:

1. A method of forming a torque-transmitting coupling comprising:
    forming at least one fitting having at least one elongated tube conforming area, said at least one elongated tube conforming area forming at least one chamfer surface and having at least one overflow groove and a plurality of flat surfaces, said at least one elongated tube conforming area having at least one associated tube arc length that is approximately equal in length to a formed area length of said plurality of flat surfaces with said at least one overflow groove, wherein forming at least one chamfer surface comprises forming an upper surface, a lower surface, and a chamfer transitional surface that transitions between said upper surface and said lower surface and has a chamfer angle of approximately 20° to 25° relative to said lower surface;
    forming a tube onto said at least one fitting;
    procuring said tube; and
    forming an end portion of said tube onto said at least one elongated tube conforming area to form the torque-transmitting coupling.

2. A method as in claim 1 wherein said at least one associated tube arc length is approximately equal in length to said formed area length ±0.5%.

3. A method as in claim 1 wherein said at least one fitting is formed such that said at least one associated tube arc length and said formed area length are predetermined such that said tube is neither in tension nor in compression over said at least one elongated tube conforming area.

4. A method as in claim 1 wherein said formed area length is approximately equal to a sum of an overflow groove arc length and twice a width of said plurality of flat surfaces.

5. A method as in claim 1 wherein said tube comprises an inner surface with a plurality of fitting contact points, said at least one associated tube arc length defined as a distance along said inner surface between sequential fitting contact points over at least one forming surface area of said at least one fitting.

6. A method as in claim 5 wherein said formed area length is a distance between sequential fitting contact points on said at least one fitting over said at least one forming surface area.

7. A method as in claim 1 wherein forming at least one fitting comprises forming an arced surface between said chamfer transitional surface and said upper surface that has a significantly sized radius.

8. A method as in claim 1 further comprising corrosive inhibit treating said tube.

9. A method as in claim 8 wherein corrosive inhibit treating said tube comprises applying an alodine film to said tube.

10. A method as in claim 1 wherein forming said end portion of said tube comprises electromagnetically forming said end portion of said tube onto said at least one elongated tube conforming area.

11. A method as in claim 1 further comprising aging said tube.

12. A method as in claim 1 wherein said at least one fitting is formed in a polygon shape having a plurality of polygon surfaces comprising said plurality of flat surfaces and said at least one overflow groove.

13. A method as in claim 1, wherein said chamfer angle is approximately 20° relative to said lower surface.

14. A method of forming a torque tube comprising:
    forming at least one fitting having at least one elongated tube fusing area comprising forming at least one chamfer surface and an associated tube arc length that is approximately equal in length to a formed area length of a plurality of flat surfaces and at least one elongated overflow groove, wherein forming at least one chamfer surface comprises forming an upper surface, a lower surface, and a chamfer transitional surface that transitions between said upper surface and said lower surface and has a chamfer angle of approximately 20° to 25° relative to said lower surface;

procuring an elongated tube; and forming an end portion of said elongated tube onto said elongated tube fusing area to form a torque-transmitting coupling.

15. A method as in claim 14 wherein said at least one associated tube arc length is approximately equal in length to said formed area length ±0.5%.

16. A method as in claim 14 wherein said at least one fitting is formed such that said at least one associated tube arc length and said formed area length are predetermined so that said elongated tube is neither in tension nor in compression over said at least one elongated tube conforming area.

17. A method as in claim 14 wherein said formed area length is approximately equal to a sum of an overflow groove arc length and twice a width of said plurality of flat surfaces.

18. A method as in claim 14 wherein said elongated tube comprises an inner surface with a plurality of fitting contact points, said at least one associated tube arc length defined as a distance along said inner surface between sequential fitting contact points over at least one formed area length of said at least one fitting.

19. A method as in claim 18 wherein said at least one formed area length is a distance between sequential fitting contact points on said at least one fitting over said at least one elongated tube fusing area.

20. A method as in claim 14 wherein forming at least one fitting comprises forming an arced surface between said chamfer transitional surface and said upper surface that has a significantly sized radius.

21. A method as in claim 14 further comprising corrosive inhibit treating said elongated tube.

22. A method as in claim 21 wherein corrosive inhibit treating said elongated tube comprising applying an alodine film to said elongated tube.

23. A method as in claim 14 wherein forming an elongated tube comprises electromagnetically forming said end portion of said elongated tube over said at least one fitting.

24. A method as in claim 14 further comprising artificially aging said elongated tube.

25. A torque tube formed according to the method of claim 14.

26. A torque tube comprising:
at least one fitting having at least one elongated tube fusing area comprising:
at least one chamfer surface;
at least one elongated overflow groove; and
a plurality of flat surfaces,
said at least one elongated tube fusing area having at least one associated tube arc length that is approximately equal in length to a formed area length of said plurality of flat surfaces with said at least one elongated overflow groove; and an elongated tube formed onto said elongated tube fusing area, wherein said at least one chamfer surface comprises:
at least one upper surface;
at least one lower surface; and
at least one chamfer transitional surface forming said at least one chamfer surface with said at least one upper surface and said at least one lower surface and having a chamfer angle of approximately 20° to 25° relative to said at least one lower surface.

27. A torque tube as in claim 26 wherein said at least one associated tube arc length is approximately equal in length to said formed area length ±0.5%.

28. A torque tube as in claim 26 wherein said at least one fitting is formed such that said at least one associated tube arc length and said formed area length are predetermined such that said elongated tube is neither in tension nor in compression over said at least one elongated tube fusing area.

29. A torque tube as in claim 26 wherein said formed area length is approximately equal to a sum of an overflow groove arc length and twice a width of said plurality of flat surfaces.

30. A torque tube as in claim 26 wherein said elongated tube comprises an inner surface with a plurality of fitting contact points, said at least one associated tube arc length defined as a distance along said inner surface between sequential fitting contact points over said at least one elongated tube fusing area.

31. A torque tube as in claim 30 wherein said formed area length is a distance between sequential fitting contact points on said at least one fitting over said at least one elongated tube fusing area.

32. A torque tube as in claim 26 further comprising an arced surface between said at least one chamfer transitional surface and said at least one upper surface that has a significantly sized radius.

33. A torque tube as in claim 26 wherein said elongated tube is electromagnetically formed onto said at least one fitting.

34. A torque tube as in claim 26 wherein said elongated tube has at least one corrosive inhibiting layer.

35. A torque tube as in claim 34 wherein said at least one corrosive inhibiting layer comprises an alodine layer and a paint layer.

36. A torque tube as in claim 26 wherein said elongated tube is aged to have a T-81 temper.

37. A vehicle comprising:
at least one torque tube comprising;
at least one fitting having at least one elongated tube conforming area comprising:
at least one chamfer surface; comprising;
at least one upper surface;
at least one lower surface; and
at least one chamfer transitional surface forming said at least one chamfer surface with said at least one upper surface and said at least one lower surface and having a chamfer angle of approximately 20° to 25° relative to said at least one lower surface;
at least one elongated overflow groove; and
a plurality of flat surfaces,
said at least one elongated tube conforming area having at least one associated tube arc length that is approximately equal in length to a formed area length of said plurality of flat surfaces with said at least one elongated overflow groove; and an elongated tube formed onto said at least one elongated tube conforming area, wherein said at least one elongated tube comprises an inner surface, said at least one associated tube arc length defined as a distance along said inner surface between sequential fitting contact points over said at least one elongated tube conforming area.

* * * * *